US 6,648,540 B2

(12) United States Patent
Brisson et al.

(10) Patent No.: US 6,648,540 B2
(45) Date of Patent: Nov. 18, 2003

(54) RABBET PLATE FOR COUPLING ROTORS

(75) Inventors: Bruce William Brisson, Galway, NY (US); Kieman Francis Ryan, Niskayuna, NY (US); Michael Earl Montgomery, Niskayuna, NY (US); Edward A. Dewhurst, Niskayuna, NY (US); Dennis Roger Ahl, Sprakers, NY (US); Joseph Mark Serafini, Schenectady, NY (US); Mark Steven Pape, Scotia, NY (US); Gary Edward Yehle, Clifton Park, NY (US)

(73) Assignee: General Electric Co., Schenectady, NY (US)

( * ) Notice: Subject to any disclaimer, the term of this patent is extended or adjusted under 35 U.S.C. 154(b) by 0 days.

(21) Appl. No.: 09/951,767

(22) Filed: Sep. 14, 2001

(65) Prior Publication Data

US 2003/0053852 A1 Mar. 20, 2003

(51) Int. Cl.⁷ .................................. F16D 1/00
(52) U.S. Cl. ............... 403/16; 403/192; 403/408.1; 464/182; 416/198 A
(58) Field of Search .............. 403/16, 335–338, 403/408.1, 168, 192, 193, 200, 26; 416/244 A, 198 A, 200 A; 464/182

(56) References Cited

U.S. PATENT DOCUMENTS 2,796,748 A * 6/1957 Sheppard .................... 464/182
4,573,875 A * 3/1986 Emeterio et al. ........ 416/198 A
5,258,675 A 11/1993 Nelessen

FOREIGN PATENT DOCUMENTS

| GB | 723462 | * | 2/1955 | ............. 416/244 A |
| IT | 283948 | * | 3/2002 | ............. 416/244 A |
| JP | 58-57004 | * | 4/1983 | ............. F01D/5/06 |
| JP | 63-76916 | * | 4/1988 | ................ 403/337 |
| JP | 2-150509 | * | 6/1990 | ............. 416/244 A |

* cited by examiner

Primary Examiner—Gregory J. Binda
Assistant Examiner—Michael P. Ferguson
(74) Attorney, Agent, or Firm—Hunton & Williams LLP

(57) ABSTRACT

A locating plate for locating a first piece of rotary machinery relative to a second piece of rotary machinery is provided. The plate has a first periphery surface for mating with a first receiving surface of the first piece of rotary machinery and a second periphery surface for mating with a second receiving surface of the second piece of rotary machinery. The plate also has at least one attaching device for use in attaching the plate to the first piece of rotary machinery and at least one removal device for use in removing the plate from the first piece of rotary machinery. The plate is removably attachable to the second piece of rotary machinery, and the second periphery surface is sizable independently from the first periphery surface.

14 Claims, 3 Drawing Sheets

RABBET PLATE FOR COUPLING ROTORS

BACKGROUND OF THE INVENTION

Embodiments of the invention relate to mechanical connectors for equipment. More particularly, embodiments of the invention relate to mechanical connectors for rotary equipment.

Turbine units can be manufactured in several pieces and then assembled at the location at which they are to be used. Precise alignment between pieces of the turbine unit being connected is essential for proper operation of the turbine.

SUMMARY OF THE INVENTION

The invention provides, among other things, solutions to problems associated with assembling pieces of equipment outside of the manufacturing facility.

Examples of the invention include a locating plate for locating a first piece of rotary machinery relative to a second piece of rotary machinery. The plate has a first periphery surface for mating with a first receiving surface of the first piece of rotary machinery and a second periphery surface for mating with a second receiving surface of the second piece of rotary machinery. The plate also has at least one attaching device for use in attaching the plate to the first piece of rotary machinery and at least one removal device for use in removing the plate from the first piece of rotary machinery. The plate is removably attachable to the second piece of rotary machinery, and the second periphery surface is sizable independently from the first periphery surface.

Examples of the invention include a locating plate for locating a first piece of rotary machinery relative to a second piece of rotary machinery such that a rotational axis of the first piece of rotary machinery is coaxial with a rotational axis of the second piece of rotary machinery. The plate has a first periphery surface for mating with a first receiving surface of the first piece of rotary machinery and a second periphery surface for mating with a second receiving surface of the second piece of rotary machinery. The plate also has an annular groove between the first and second periphery surfaces, at least one attaching device for use in attaching the plate to the first piece of rotary machinery, and at least one removal device for use in removing the plate from the first piece of rotary machinery. The plate is removably attachable to the second piece of rotary machinery by an interference fit between the second periphery surface and the second receiving surface and the second periphery surface is sizable independently from the first periphery surface. The first receiving surface is a recess in a first coupling that is part of the first piece of rotary machinery, the second receiving surface is a recess in a second coupling that is part of the second piece of rotary machinery, and the annular groove allows the plate to be positioned in the first and second couplings without the first periphery surface contacting the second receiving surface and without the second periphery surface contacting the first receiving surface.

Examples of the invention include a turbine rotor assembly having a first turbine rotor having a first coupling and a plate for locating the first turbine rotor relative to a second rotor. The plate has a first periphery surface that mates with a first receiving surface of the first turbine rotor and a second periphery surface for mating with a second receiving surface of the second rotor. The plate also has at least one connector that connects the plate to the first turbine rotor and at least one removal device for use in removing the plate from the first turbine rotor. The plate is removably attachable to the second rotor, and the second periphery surface is sizable independently from the first periphery surface.

Examples of the invention include a method of adapting a first piece of rotary machinery to a second piece of rotary machinery. The method includes sizing a second periphery surface of a plate to match a measured size of a second receiving surface of the second piece of rotary machinery. The method also includes attaching the plate to the first piece of rotary machinery such that a first periphery surface of the plate mates with a first receiving surface of the first piece of rotary machinery and attaching the plate to the second piece of rotary machinery such that the second periphery surface mates with the second receiving surface. The plate is removably attachable to the second piece of rotary machinery and the second periphery surface is sizable independently from the first periphery surface.

These and other features of the invention will be readily apparent to those skilled in the art upon reading this disclosure in connection with the attached drawing figures.

DETAILED DESCRIPTION OF THE INVENTION

It is often imperative that two separate pieces of rotary equipment be aligned coaxially in order to operate properly. In the case of one such piece of rotary equipment being replaced, the appropriate alignment of the new piece of rotary equipment with existing equipment can be a challenge. The invention provides apparatuses and methods for efficiently aligning two pieces of equipment, for example two pieces of rotary equipment. For simplicity, the invention will be described with reference to two turbines being connected together. However, the invention is also appropriate for connecting, for example, a turbine to a generator to be driven by the turbine.

The following discussion of the invention will use the example of the replacement of a turbine rotor and the associated need to properly align the replacement rotor with an existing rotor. Such a rotor replacement can be extremely expensive to the owner of the equipment due to the downtime resulting from the replacement operation.

Two pieces of rotary equipment can be attached to each other by couplings that have mating parts that cause the two couplings and, therefore, the machinery to be properly aligned. The size of these mating alignment components is often not known until the rotor to be replaced is removed. After removal, measurements can be taken to determine the proper size of the mating alignment components of the new rotor. After these measurements are determined, the new rotor (often a very large piece of machinery) is sent to a machine shop to properly size its mating alignment components. This procedure is expensive and time consuming due to the size of the new rotor.

The invention provides a more efficient way to properly size the mating alignment components of the new rotor.

Figure 2:
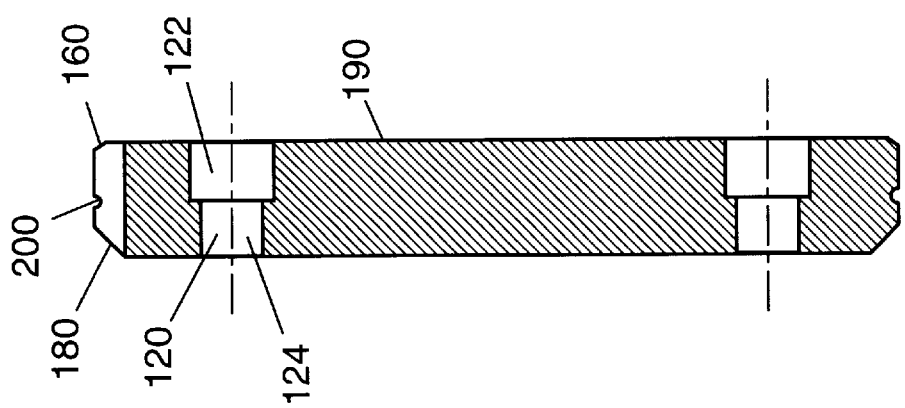
FIG. 2 is a sectional view of the rabbet plate shown in FIG. 1.
Figure 1:
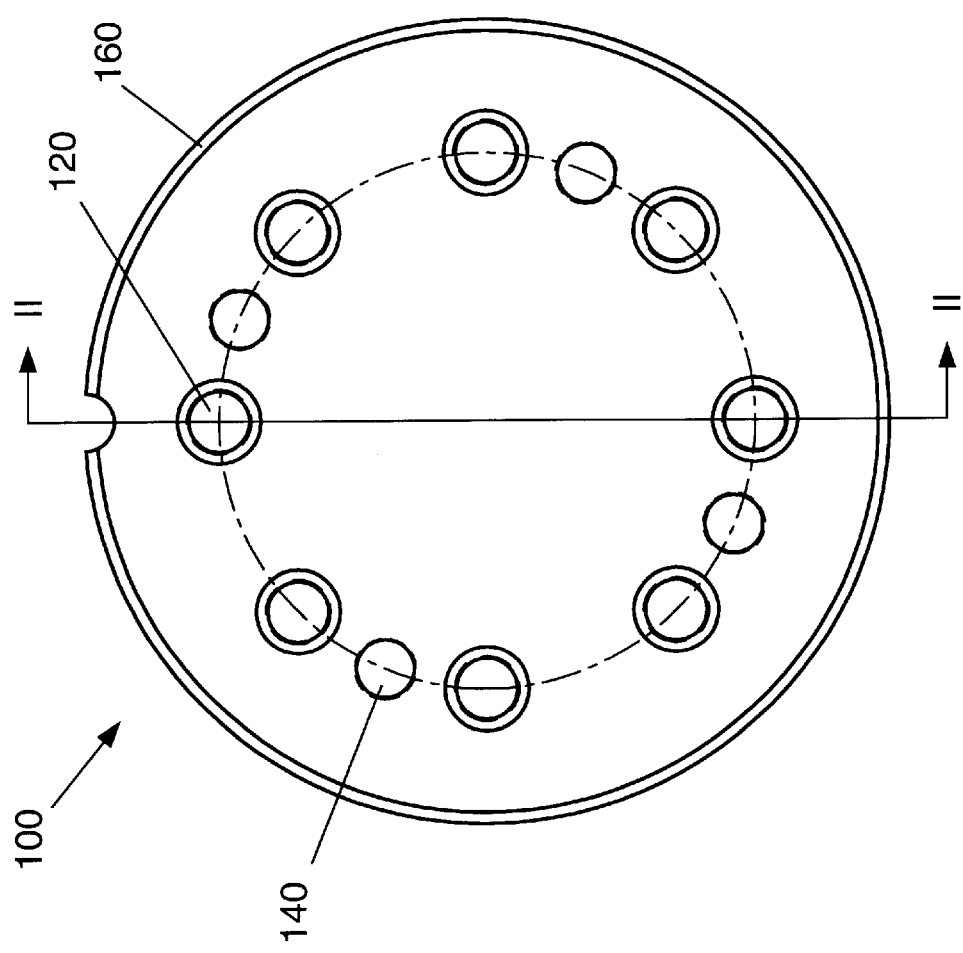
FIG. 1 is a front view of an example of a rabbet plate in accordance with the invention.

FIG. 1 shows a rabbet plate 100 used to properly align two pieces of rotary equipment. Rabbet plate 100 has, in this example, eight attachment holes 120 used to attach rabbet plate 100 to a new rotor to be coupled to an existing rotor or generator. FIG. 2 is a cross-section of rabbet plate 100 along section line II—II shown in FIG. 1. In this example, attachment hole 120 has a larger diameter portion 122 and a smaller diameter portion 124. Larger diameter portion 122 is provided to accommodate the head of a fastener so that the head of the fastener does not protrude beyond face 190 of rabbit plate 100. In this example, smaller diameter portion 124 of attachment hole 120 is provided with threads that do not engage the fastener used to attach rabbet plate 100 to the new rotor, but are provided to facilitate lifting of rabbet plate 100 during assembly. As rabbet plate 100 can weigh as much as 300 pounds or more, the threads in smaller diameter portion 124 can greatly facilitate the rigging and lifting of rabbet plate 100.

Rabbet plate 100 is provided, in this example, with four jacking holes 140. Jacking holes 140 are, in this example, provided with threads so that jacking bolts (not shown) can be threaded into jacking holes 140 and tightened to remove rabbet plate 100 from the new rotor. Rabbet plate 100 is also provided with chamfered edges 160, 180 to facilitate assembly of rabbet plate 100, the new rotor and the existing rotor or generator. As shown in FIG. 2, rabbet plate 100 is also provided with a groove 200, the purpose of which will be discussed below with reference to FIG. 3.

Figure 3:
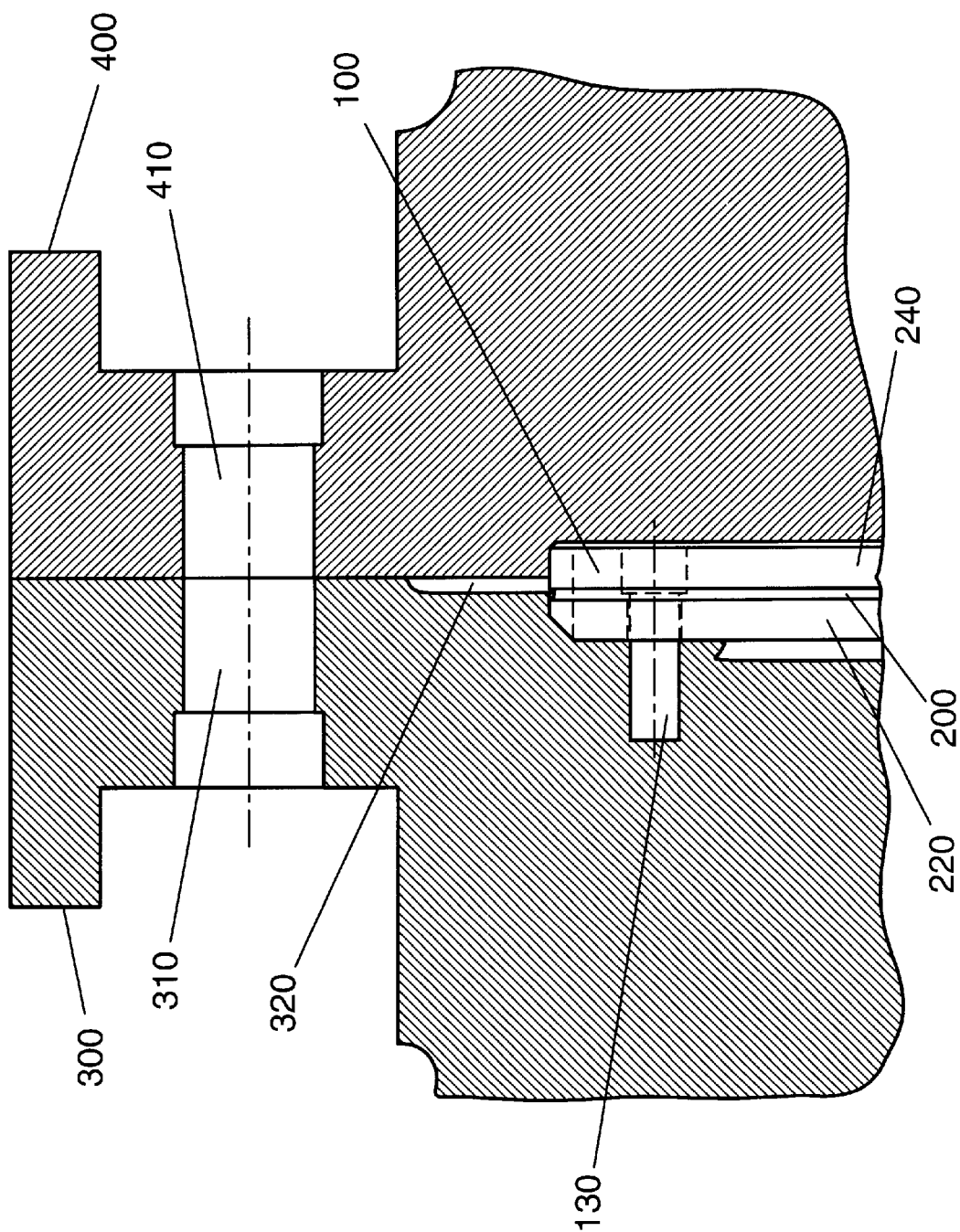
FIG. 3 is a sectional view of a coupling in accordance with the invention.

FIG. 3 shows an example of rabbet plate 100 in position between a first coupling 300 of a new rotor and a second coupling 400 of an existing rotor or generator. First coupling 300 has a plurality of coupling holes 310 that align with a plurality of coupling holes 410 in second coupling 400. Coupling holes 310, 410 are used to, in this example, bolt first coupling 300 to second coupling 400. As shown in FIG. 3, rabbet plate 100 is bolted to first coupling 300 by a bolt 130. Although only one bolt 130 is shown in FIG. 3, it is noted that a plurality (8 in the example shown in FIGS. 1 and 2) of bolts 130 are used to attach rabbet plate 100 to first coupling 300.

In this example, rabbet plate 100 has a first periphery surface 220 and second periphery surface 240 separated by groove 200. First periphery surface 220 is sized to properly mate with first coupling 300. Second periphery surface 240 is sized, for example machined, after its proper size is determined by measuring second coupling 400. Groove 200 is provided to separate first periphery surface 220 from second periphery surface 240 in order to allow for variations in the final seating depth of rabbet plate 100 in first coupling 300. A relief area 320 can be provided in first coupling 300 to further allow for variations in the seating depth of rabbet plate 100 in first coupling 300.

Figure 4:
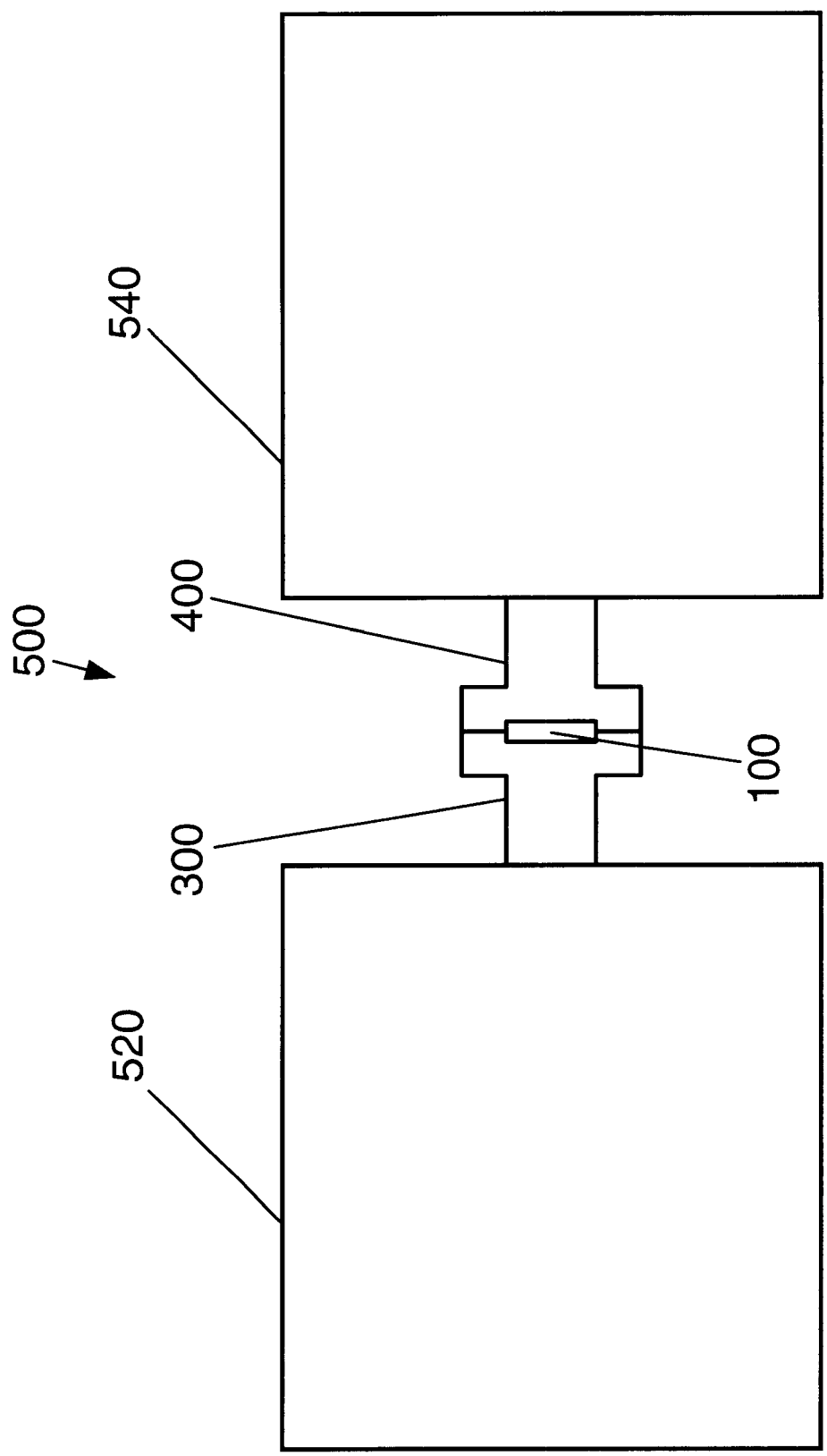
FIG. 4 is a turbine rotor assembly in accordance with the invention.

FIG. 4 shows an example of turbine rotor assembly 500 in which a first rotor 520 is connected to a second rotor 540. Proper alignment of this connection is achieved with rabbet plate 100 being located between first coupling 300 and second coupling 400.

While it is possible to properly size first periphery surface 220 of rabbet plate 100 prior to determining the proper size of second periphery surface 240, it is often preferable to finally size both first periphery surface 220 and second periphery surface 240 in the same machining set up to ensure the best possible run out between these two outside diameters. In addition, if any resizing or reconditioning of the female rabbet of the existing rotor or generator is necessary, it is preferably performed prior to final measurement and final sizing of the rabbet plate 100. A slight interference fit between second periphery surface 240 and second coupling 400 is preferable. For example, a 0.000 to 0.002 press fit with no more than 5° F. temperature difference between second coupling 400, rabbet plate 100 and the measuring instruments is desirable.

Although the above examples discuss turbine rotors and/or a generator, it is noted that the invention is applicable to any equipment, including other rotary equipment, requiring precise alignment. Although the above examples discuss the use of bolts as fasteners, it is noted that other appropriate fasteners could also be used.

While the invention has been described with reference to particular embodiments and examples, those skilled in the art will appreciate that various modifications may be made thereto without significantly departing from the spirit and scope of the invention.

What is claimed is:

1. A locating plate for locating a first piece of rotary machinery relative to a second piece of rotary machinery, such that the first piece of rotary machinery mates with and is in contact with the second piece of rotary machinery, the plate comprising:

a first periphery surface for mating with a first receiving surface of the first piece of rotary machinery;

a second periphery surface for mating with a second receiving surface of the second piece of rotary machinery;

at least one attaching device for use in attaching the plate to the first piece of rotary machinery; and at least one removal device for use in removing the plate from the first piece of rotary machinery;

wherein, the plate is removably attachable to the second piece of rotary machinery; and the second periphery surface is sizable independently from the first periphery surface;

wherein the first receiving surface is a recess in a first coupling that is part of the first piece of rotary machinery;

wherein the second receiving surface is a recess in a second coupling that is part of the second piece of rotary machinery;

wherein the plate locates the first coupling relative to the second coupling such that a rotational axis of the first piece of rotary machinery is coaxial with a rotational axis of the second piece of rotary machine; and the plate further comprising an annular groove between the first and second periphery surfaces.

2. The plate of claim 1, wherein the plate is removably attachable to the second piece of rotary machinery by an interference fit between the second periphery surface and the second receiving surface.

3. The plate of claim 1, wherein the annular groove allows the plate to be positioned in the first and second couplings without the first periphery surface contacting the second receiving surface and without the second periphery surface contacting the first receiving surface.

4. The plate of claim 1, wherein the plate includes an attachment hole, the attachment hole including a larger diameter portion and a smaller diameter portion, the smaller diameter portion being provided with threads.

5. The plate of claim 1, wherein the plate includes chamfered edges to facilitate assembly of the plate, the first piece of rotary machinery and the second piece of rotary machinery.

6. A locating plate for locating a first piece of rotary machinery relative to a second piece of rotary machinery such that a rotational axis of the first piece of rotary machinery is coaxial with a rotational axis of the second piece of rotary machinery, the plate comprising:
  a first periphery surface for mating with a first receiving surface of the first piece of rotary machinery;
  a second periphery surface for mating with a second receiving surface of the second piece of rotary machinery;
  an annular groove between the first and second periphery surfaces;
  at least one attaching device for use in attaching the plate to the first piece of rotary machinery; and
  at least one removal device for use in removing the plate from the first piece of rotary machinery,
  wherein, the plate is removably attachable to the second piece of rotary machinery by an interference fit between the second periphery surface and the second receiving surface,
  the second periphery surface is sizable independently from the first periphery surface,
  the first receiving surface is a recess in a first coupling that is part of the first piece of rotary machinery,
  the second receiving surface is a recess in a second coupling that is part of the second piece of rotary machinery, and
  the annular groove allows the plate to be positioned in the first and second couplings without the first periphery surface contacting the second receiving surface and without the second periphery surface contacting the first receiving surface.

7. The locating plate of claim 6 wherein the plate includes an attachment hole, the attachment hole including a larger diameter portion and a smaller diameter portion, the smaller diameter portion being pr vided with threads.

8. A turbine rotor assembly, comprising:
  a first turbine rot r having a first coupling;
  a plate for locating the first turbine rotor relative to a second rotor, such that the first turbine rotor mates with and is in contact with the second rotor, the plate having
    a first periphery surface that mates with a first receiving surface of the first turbine rotor;
    a second periphery surface for mating with a second receiving surface of the second rotor;
    at least on connector that connects the plate to the first turbine rotor; and
    at least on removal device for use in removing the plate from the first turbine rotor,
  wherein, the plat is removably attachable to the second rotor, and
  the second periphery surface is sizable independently from the first periphery surface;
  wherein the first receiving surface is a recess in a first coupling that is part of the first turbine rotor;
  wherein the second receiving surface is a recess in a second coupling that is part of the second rotor;
  wherein the plate locate the first coupling relative to the second coupling such that a rotational axis of the first turbine rotor is coaxial with a rotational axis of the second rotor; and
  the assembly further comprising an annular groove between the first and second periphery surfaces.

9. The assembly of claim 8, wherein the plate is removably attachable to the second rotor by an interference fit between the second periphery surface and the second receiving surface.

10. The assembly of claim 8, wherein the annular groove allows the plate to be positioned in the first and second couplings without the first periphery surface contacting the second receiving surface and without the second periphery surface contacting the first receiving surface.

11. A method of adapting a first piece of rotary machinery to a second piece of rotary machine, such that the first piece of rotary machinery mates with and is in contact with the second piece of rotary machinery, the method comprising:
  sizing a second periphery surface of a plate to match a measured size of a second receiving surface of the second piece of rotary machinery;
  attaching the plat to the first piece of rotary machinery such that a first periphery surface of the plate mates with a first receiving surface of the first piece of rotary machinery; and
  attaching the plate to the second piece of rotary machinery such that the second periphery surface mates with the second receiving surface,
  wherein, the pint is removably attachable to the second piece of rotary machinery, and
  the second periphery surface is sizable independently from the first periphery surface;
  wherein the first receiving surface is a recess in a first coupling that is part of the first piece of rotary machinery;
  wherein the second receiving surface is a recess in a second coupling that is part of the second piece of rotary machinery;
  wherein the plate locate the first coupling relative to the second coupling such that a rotational axis of the first piece of rotary machinery is coaxial with a rotational axis of the second piece of rotary machine; and
  wherein the plate further comprises an annular groove between the first and second periphery surfaces.

12. The method of claim 11, wherein the second periphery surface is sized by machining.

13. The method of claim 11, wherein the plate is removably attached to the second piece of rotary machinery by an interference fit between the second periphery surface and the second receiving surface.

14. The method of claim 11, wherein the annular groove allows the plate to be positioned in the first and second couplings without the first periphery surface contacting the second receiving surface and without the second periphery surface contacting the first receiving surface.

* * * * *

UNITED STATES PATENT AND TRADEMARK OFFICE
CERTIFICATE OF CORRECTION

PATENT NO. : 6,648,540 B2
DATED : November 18, 2003
INVENTOR(S) : Brisson et al.

It is certified that error appears in the above-identified patent and that said Letters Patent is hereby corrected as shown below:

Title page,
Item [75], Inventors, replace "Kieman" with -- Kiernan --

Column 5,
Line 36, replace "pr vided" with -- provided --
Line 38, replace "rot r" with -- rotor --
Lines 46 and 48, replace "on" with -- one --
Line 50, replace "plat" with -- plate --
Line 59, replace "locate" with -- locates --

Column 6,
Line 16, replace "machine" with -- machinery --
Line 22, replace "plat" with -- plate --
Line 30, replace "pint" with -- plate --
Line 42, replace "locate" with -- locates --
Line 45, replace "machine" with -- machinery --

Signed and Sealed this

First Day of June, 2004

JON W. DUDAS
*Acting Director of the United States Patent and Trademark Office*